United States Patent
Schafroth et al.

(10) Patent No.: US 11,863,098 B2
(45) Date of Patent: Jan. 2, 2024

(54) MULTI-LEVEL INVERTER

(71) Applicant: BorgWarner Engineering Services Switzerland AG, Brügg (CH)

(72) Inventors: Thomas Schafroth, Ipsach (CH); Peter Schlienger, Auenstein (CH); Nick Beeli, Attalens (CH)

(73) Assignee: BorgWarner Engineering Services Switzerland AG, Brügg (CH)

( * ) Notice: Subject to any disclaimer, the term of this patent is extended or adjusted under 35 U.S.C. 154(b) by 386 days.

(21) Appl. No.: 17/276,640

(22) PCT Filed: Sep. 16, 2019

(86) PCT No.: PCT/EP2019/074665
§ 371 (c)(1),
(2) Date: Mar. 16, 2021

(87) PCT Pub. No.: WO2020/058171
PCT Pub. Date: Mar. 26, 2020

(65) Prior Publication Data
US 2023/0075792 A1    Mar. 9, 2023

(30) Foreign Application Priority Data
Sep. 18, 2018 (EP) .................................... 18195287

(51) Int. Cl.
*H02P 1/00* (2006.01)
*H02P 27/14* (2006.01)
(Continued)

(52) U.S. Cl.
CPC .............. *H02P 27/14* (2013.01); *H02M 1/12* (2013.01); *H02M 7/487* (2013.01); *H02M 7/5395* (2013.01)

(58) Field of Classification Search
CPC ........ H02P 27/14; H02M 1/12; H02M 7/5395
(Continued)

(56) References Cited

U.S. PATENT DOCUMENTS 6,031,738 A * 2/2000 Lipo ..................... H02M 7/487
363/43
9,435,263 B2  9/2016 Chai
(Continued)

FOREIGN PATENT DOCUMENTS

JP   2003169480   6/2003
WO  2017/083521   5/2017

OTHER PUBLICATIONS

Communication pursuant to Article 94(3) EPC as issued by the European Patent Office, dated Sep. 22, 2022, for European Patent Application No. 19769463.1; 6 pages.
(Continued)

*Primary Examiner* — Erick D Glass
(74) *Attorney, Agent, or Firm* — Faegre Drinker Biddle & Reath LLP (57) ABSTRACT

Method of controlling a multi-level inverter having inputs connected to a gate drive unit controlling the inverter and an output connected to a load, the multi-level inverter capable of generating a PWM voltage signal having three or more modulation levels, the inverter powered by a voltage supply and comprising at least one neutral point (NP), the method comprising operating the multi-level inverter in a standard modulation pattern having three or more modulation levels when one or more parameters representative of neutral point stability each have a value within a first range indicative of a high neutral point stability, and operating the multi-level inverter with a two-level modulation pattern when said one or more parameters representative of neutral point stability each have a value within a second range indicative of a low
(Continued)

neutral point stability, the first range separated from the second range by a threshold value.

14 Claims, 6 Drawing Sheets

(51) Int. Cl.
*H02M 1/12* (2006.01)
*H02M 7/487* (2007.01)
*H02M 7/5395* (2006.01)

(58) Field of Classification Search
USPC .......................................................... 318/504
See application file for complete search history.

(56) References Cited

U.S. PATENT DOCUMENTS

| | | | |
|---|---|---|---|
| 9,520,800 B2* | 12/2016 | Tian | H02M 7/4833 |
| 2014/0036555 A1 | 2/2014 | Kolhatkar | |
| 2014/0376287 A1* | 12/2014 | Narimani | H02M 7/483 363/60 |
| 2016/0141977 A1 | 5/2016 | Oka | |
| 2016/0197491 A1* | 7/2016 | Park | H01F 38/14 307/104 |
| 2020/0350847 A1* | 11/2020 | Geyer | H02P 21/30 |
| 2022/0144093 A1* | 5/2022 | Chen | H02M 3/01 |

OTHER PUBLICATIONS

"Hybrid modulation for neutral point voltage ripple reduction in DC-fed three-level motor drive Systems", Zhang Xuning et al., 2015 9th International Conference on Power Electronics and ECCE ASIA (ICPE-ECCE ASIA), Korean Institute of Power Electronics, Jun. 1, 2015; 7 pages.

International Search Report and Written Opinion issued by the International Searching Authority, dated Dec. 12, 2019, for International Patent Application No. PCT/EP2019/074665; 14 pages.

Jens Onno Krah, Markus Holtgen, Andreas Rath, Rolf Richter, FPGA-based Control of Three-Level Inverters, PCIM Europe, May 2011, Nuremberg Germany, Paper 66; 7 pages.

Nikola Celanovic, Dushan Boroyevich, A Comprehensive Study of Neutral-Point Voltage Balancing Problem in Three-Level Neutral-Point-Clamped Voltage Source PWM Inverters, IEEE Transactions on Power Electronics, vol. 15, No. 2, Mar. 2000, pp. 242-249, 8 pages.

Kazsutoshi Yamanaka, Ahmet M.Hava, Hiroshi Kirino, Yoshiyuki Tanaka, Noritaka Koga and Tsuneo Kume, A Novel Neutral Point Potential Stabilization Technique Using the Information of Output Current Polarities and Voltage Vector, IEEE Transactions on Industry Applications, vol. 38, No. 6, Nov. 2002, pp. 1572-1580; 9 pages.

Satoshi Ogasawara and Hirofumi Akagi, Analysis of variation of neutral point potential in neutral-point-clamped voltage source PWM inverters, IEEE 0-7803-1462-x/93, Okayama University Digital Information Repository, 7 pages.

Mario Schweizer, Thomas Friedli, and Johann W. Kolar, Comparative Evaluation of Advanced Three-Phase Three-Level Inverter/ Converter Topologies Against Two-Level Systems, IEEE Transactions on Industrial Electronics, vol. 60, No. 12, pp. 5515-5527, Dec. 2013, 14 pages.

* cited by examiner

MULTI-LEVEL INVERTER

CROSS-REFERENCE TO RELATED APPLICATIONS

The present application is a national stage entry of International (PCT) Patent Application Number PCT/EP2019/074665, filed Sep. 16, 2019, which claims priority to European Patent Application No. 18195287.0, filed Sep. 18, 2018, the subject matter of which are expressly incorporated herein by reference.

The present invention relates to multi-level voltage source PWM (Pulse Width Modulated) inverters and in particular for 3-level inverters which are suitable for driving high speed electrical machines, especially for mobile applications. The invention also relates to a drive including an inverter for controlling an electrical motor.

A multi-level inverter is a power electronic device generating an AC voltage signal output using DC voltage inputs. A two-level inverter is used in many applications to generate an AC voltage from a DC voltage. A two-level Inverter creates two different voltages for the load, for instance if a DC voltage $+V_{dc}$ is the input, a two-level inverter may provide switched $+V_{dc}2$ and $-V_{dc}2$ signals of varying pulse width at the output (Phase to star). Although this method of creating AC is simple and effective, one of the drawbacks are the harmonic distortions in the output voltage and also has a high dv/dt as compared to that of higher level inverters.

Three-level and higher level inverters (five, seven, etc) enable the generation of smoother stepped output waveforms with lower dv/dt and also lower harmonic distortions.

In particular, Multi-level (three and higher level) inverters allow an important reduction in inverter induced motor losses without external sinusoidal filters. Especially in mid- and full load, the phase current THD (total harmonic distortion) of a Multi-level inverter is much lower than with a comparable two-level inverter.

A Multi-level inverter requires however additional power switching devices, additional gate control hardware and the need to measure and control two or more DC bus voltages. The control of the different DC bus voltages requires either additional hardware or more complex software for processing different PWM patterns.

Balancing of the neutral point voltage in a three or higher level voltage source inverter by using appropriate PWM patterns is however a complex and challenging task. The required neutral point current to eliminate a possible neutral point potential deviation can be derived from the phase currents polarity information (see *FPGA-based Control of Three-Level Inverters, PCIM Europe* May 2011, Nuremberg Germany, Jens Onno Krah, Markus Höltgen, Andreas Rath, Rolf Richter [1], and A comprehensive *Study of Neutral-Point Voltage Balancing Problem in Three-Level Neutral-Point-Clamped Voltage Source PWM Inverters, IEEE Transactions on power electronics* vol 15 no2 March 2000, Nikola Celanovic, Dushan Boroyevich [2]). The methods described in [1] and [2] promise full controllability of the neutral point with some restrictions on power factor $\cos(\Phi)$ and output frequency. A critical situation however arises in low frequency and high phase current inverter operation.

In *A Novel Neutral Point Potential Stabilization Technique Using the Information of Output Current Polarities and Voltage Vector, IEEE Transactions on industry applications*, vol 38, no6, November 2002, Kazsutoshi Yamanaka, Ahmet M. Hava, Hiroshi Kirino, Yoshiyuki Tanaka, Noritaka Koga and Tsuneo Kume [3] and *Analysis of variation of neutral point potential in neutral-point-clamped voltage source PWM inverter*, IEEE 0-7803-1462-x/93 *Okayama University Digital Information Repository*, Satoshi Ogasawara, Hirofumi Akagi [4], a technique using the redundant space vectors in a manner to gain control over the neutral point potential even at low frequencies is proposed, although balancing can remain impossible for a non-rotating output (0 Hz). The utilization of the redundant space vectors causes more harmonics in the output current and can lead to undesired common mode effects.

System benefits, such as increased efficiency and reduced EMC, of a three-level system compared to a two-level system is well known as described *in Comparative Evaluation of Advanced Three-Phase Three-Level Inverter/Converter Topologies Against Two-Level Systems*, Mario Schweizer, Thomas Friedli, and Johann W. Kolar [5]. These benefits can also result in reduced size of filter components and reduced chip area. The specific problem of neutral point stability is however not addressed in [5].

The term "multi-level" as used herein in relation to the inverter or to the modulation pattern is intended to encompass three-level and higher level, but not two-level, which is referred to as two-level. It may be noted that if there are more than 3 modulation levels, there will be also be more than one neutral point.

An object of the invention is to provide an accurate and economical multi-level inverter with low harmonic distortion yet high neutral point stability.

An object of the invention is to provide a method of controlling a multi-level inverter to achieve low harmonic distortion yet high neutral point stability in an efficient and economical manner.

It is advantageous to provide a multi-level inverter that is reliable and easy to control.

It is advantageous to provide a method of controlling a multi-level inverter that is reliable and easy to implement.

It is advantageous to provide a multi-level inverter that is economical to manufacture and implement.

It is advantageous to provide a multi-level inverter with a good sensorless start behavior.

Objects of the invention have been achieved by providing a method of controlling a multi-level inverter according to claim 1.

Certain objects of the invention have been achieved by providing a drive for an electrical motor, according to claim 7.

Disclosed herein is a method of controlling a multi-level inverter having inputs connected to a drive unit controlling the inverter and an output connected to a load, the multi-level inverter capable of generating a PWM voltage signal having three or more modulation levels, the inverter powered by a voltage supply and comprising at least one neutral point, the method comprising operating the multi-level inverter in a standard modulation pattern having three or more modulation levels when one or more parameters representative of neutral point stability each have a value within a first range indicative of a high neutral point stability, and operating the multi-level inverter with a two-level modulation pattern when said one or more parameters representative of neutral point stability each have a value within a second range indicative of a low neutral point stability, the first range separated from the second range by a threshold value.

In an advantageous embodiment, the load is a multiphase electric motor, and the inverter comprises a multi-level modulation circuit for each phase leg, each multi-level modulation circuit having an output connected to a corresponding phase of the electric motor.

In an advantageous embodiment, wherein the parameters representative of neutral point stability include any one or more of:

| | |
|---|---|
| $V_{np}$ | Neutral point voltage ; |
| $\omega$ | Motor stator frequency ; |
| $\varepsilon_{np}$ | Deviation of neutral point voltage ($\|V_{DC}/2 - V_{NP}\|$) in %; |
| $\cos(\varphi)$ | Motor power factor = Real power/Apparent power; |
| $I_{ph}$ | Motor phase current |
| $f_{pwm}$ | Modulation (PWM) frequency. |

Said threshold values of parameters representative of low neutral point stability may include any one or more of:

| | | |
|---|---|---|
| $\omega_{min}$ | Minimum motor stator frequency | Threshold value having a value between 0 to 40% of nominal speed; |
| $\varepsilon_{np\_max}$ | Allowed deviation of neutral point voltage in % | Threshold value having a value between 0 to 50 [%]; |
| $PF_{min}$ | Motor minimum power factor | Threshold value having a value between 0 to 0.7 [—]; |
| $I_{ph\_min}$ | Motor minimum phase current | Threshold value having a predetermined value depending on the characteristics of the motor [A]; |
| $f_{pwm\_min}$ | Minimum PWM frequency | Threshold value having a value between 0 to 50 [kHz]. |

In an advantageous embodiment, the threshold value for each of the one or more parameters are selected as any one or more of:

| | | |
|---|---|---|
| $\omega_{min}$ | Minimum motor stator frequency | Threshold value having a value between 5% to 30% of nominal speed, |
| $\varepsilon_{np}$ | Allowed deviation of neutral point voltage in % | Threshold value having a value between 5 to 30 [%], |
| $PF_{mi}$ | Motor minimum power factor | Threshold value having a value between 0.1 to 0.5 [—], |
| $I_{ph\_min}$ | Motor minimum phase current | 5% to 40% of Nominal current [A], |
| $f_{pwm\_min}$ | Minimum PWM frequency | Threshold value having a value between 1 to 30 [kHz]. |

In an advantageous embodiment, the threshold value for each of the one or more parameters may in particular be selected as any one or more of:

| | | |
|---|---|---|
| $\omega_{min}$ | Minimum motor stator frequency | Threshold value having a value between 5% to 15% of nominal speed, |
| $\varepsilon_{np}$ | Allowed deviation of neutral point voltage in % | Threshold value having a value between 10 to 20 [%], |
| $PF_{mi}$ | Motor minimum power factor | Threshold value having a value between 0.1 to 0.3 [—], |
| $I_{ph\_min}$ | Motor minimum phase current | 10% to 30% of Nominal current [A], |
| $f_{pwm\_min}$ | Minimum PWM frequency | Threshold value having a value between 5 to 15 [kHz]. |

Also disclosed herein is a drive for an electrical motor comprising a power electronics module and a gate drive unit connected to a controller and to the power electronics module to control the motor, the power electronics module comprising a multi-level inverter having at least one output connected to at least one phase of the motor, the multi-level inverter capable of generating a PWM voltage signal having three or more modulation levels, the inverter powered by a voltage supply and comprising at least one neutral point. The controller is configured to control the gate drive unit to:
operate the multi-level inverter in a standard modulation pattern having three or more modulation levels when one or more parameters representative of neutral point stability each have a value within a first range indicative of a high neutral point stability, and to
operate the multi-level inverter with a two-level modulation pattern when said one or more parameters representative of neutral point stability each have a value within a second range indicative of a low neutral point stability,
the first range separated from the second range by a threshold value.

In an advantageous embodiment, the controller receives voltage and phase current measurement inputs from a power supply and the motor, the power supply comprising a DC voltage supply.

In an advantageous embodiment, the motor is a multi-phase (e.g three phase) motor and the inverter is a multi-phase inverter having one said output for each phase.

In an advantageous embodiment, the inverter is a diode clamped inverter.

In an embodiment, the inverter comprises a neutral point clamped (NPC) inverter circuit topology per phase leg.

In an advantageous embodiment, the inverter comprises a T-type three-level inverter circuit topology per phase leg.

In an advantageous embodiment, the threshold values are stored in, or computed from values stored in a non-transient memory of the drive.

In an advantageous embodiment, an executable control algorithm is stored in a non-transient memory of the drive, the control algorithm executable by the controller to control the gate drive unit.

Further objects and advantageous features of the invention will be apparent from the claims, from the detailed description, and annexed drawings, in which:

Figure 1A:
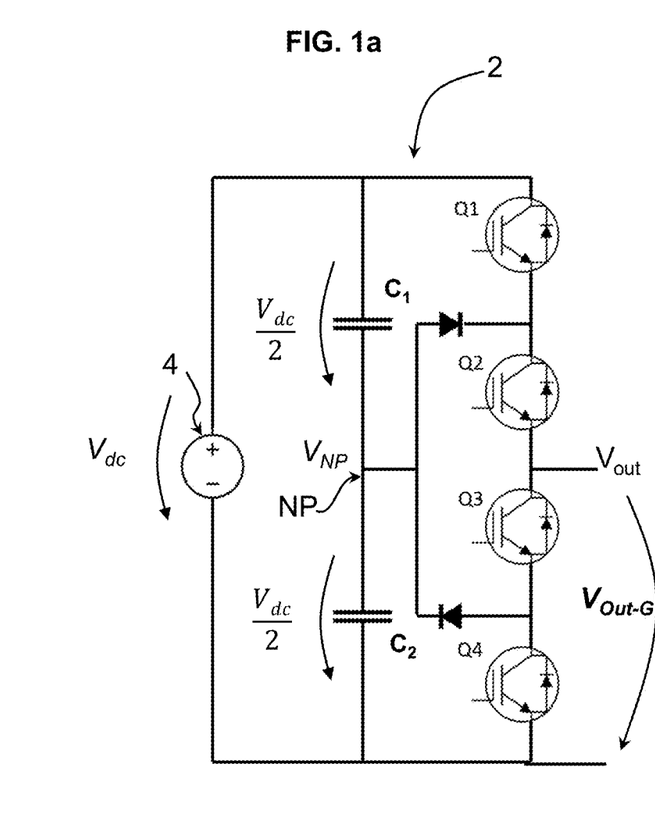
FIG. 1a is a schema of a circuit of a three-level inverter, per se known, that may be used in a multi-level inverter according to a first embodiment of the invention.
Figure 1B:
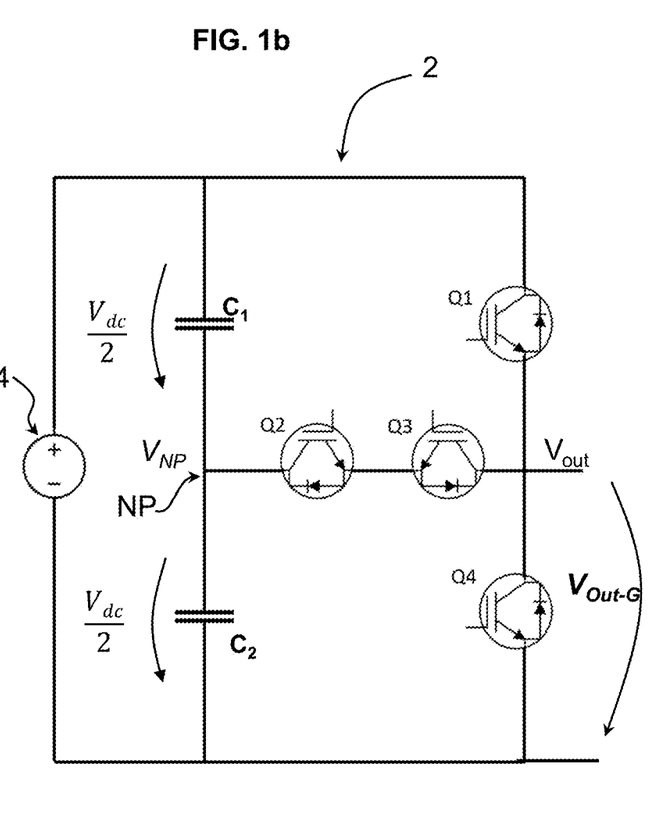
FIG. 1b is a schema of a circuit of another three-level inverter, per se known, that may be used in a multi-level inverter according to a second embodiment of the invention.

Referring to the FIGS. 1a and 1b, two different 3-level inverter topologies for one phase leg are illustrated. Both of these 3-level inverter topologies are per se known. FIG. 1a illustrates a neutral point clamped (NPC) inverter circuit topology (for one phase leg) whereas FIG. 1b illustrates a T-type three-level inverter circuit topology (for one phase leg).

In the illustrated embodiments, the inverters 2 are diode clamped inverters, however it will be appreciated that other inverter types such as flying capacitor inverters may be employed without departing from the scope of the invention.

Moreover, FIGS. 1a and 1b illustrate only one phase of a three-level inverter, but it will be appreciated that the inverter according to embodiments of the invention may be a multiphase inverter having two, three or more phases depending on the application.

Figure 5:
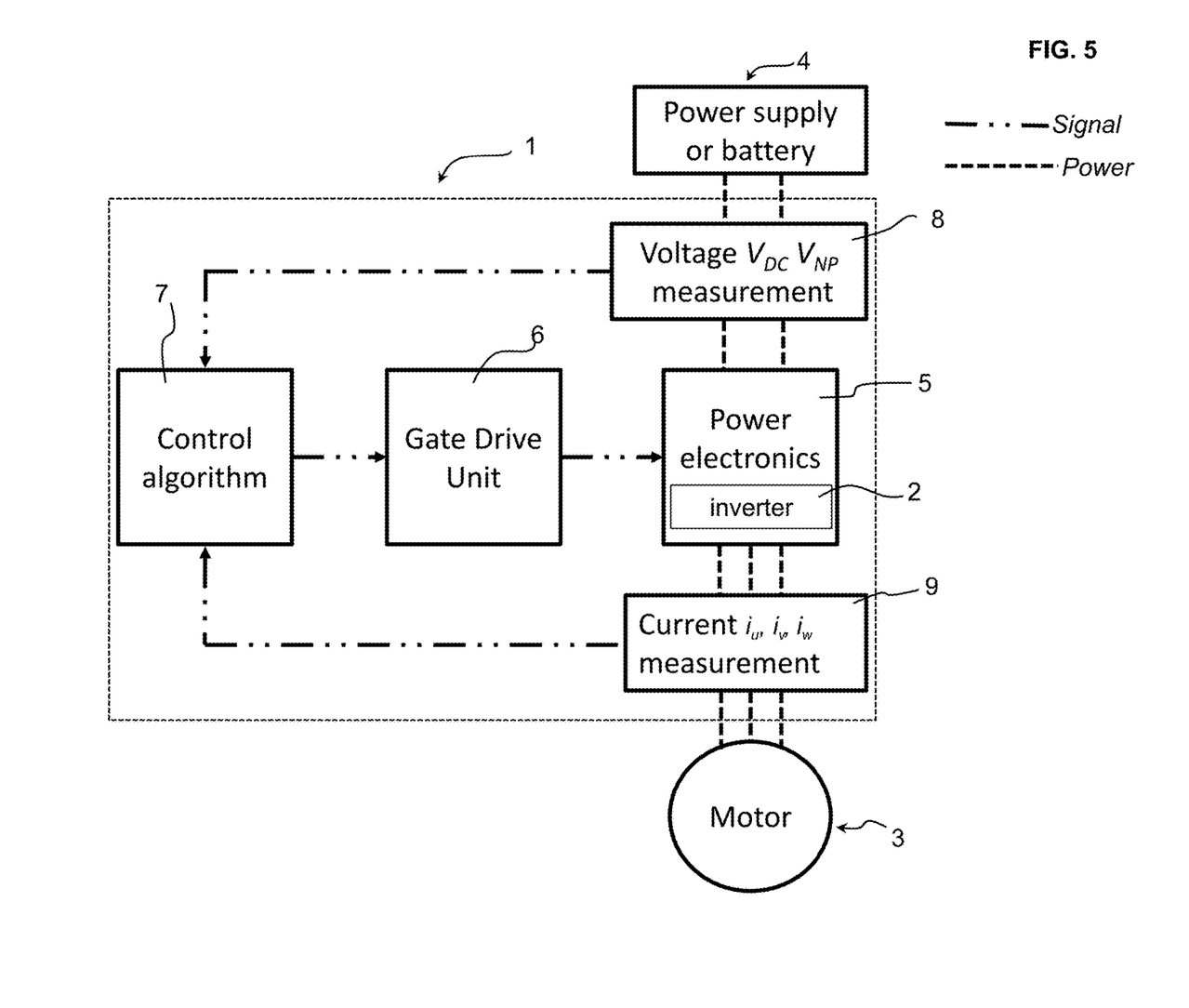
FIG. 5 is a simplified block schema illustrating an electrical motor system according to an embodiment of the invention, including an electrical motor connected to a gate drive unit and a power electronics unit comprising an inverter, according to an embodiment of the invention.
Figure 6:
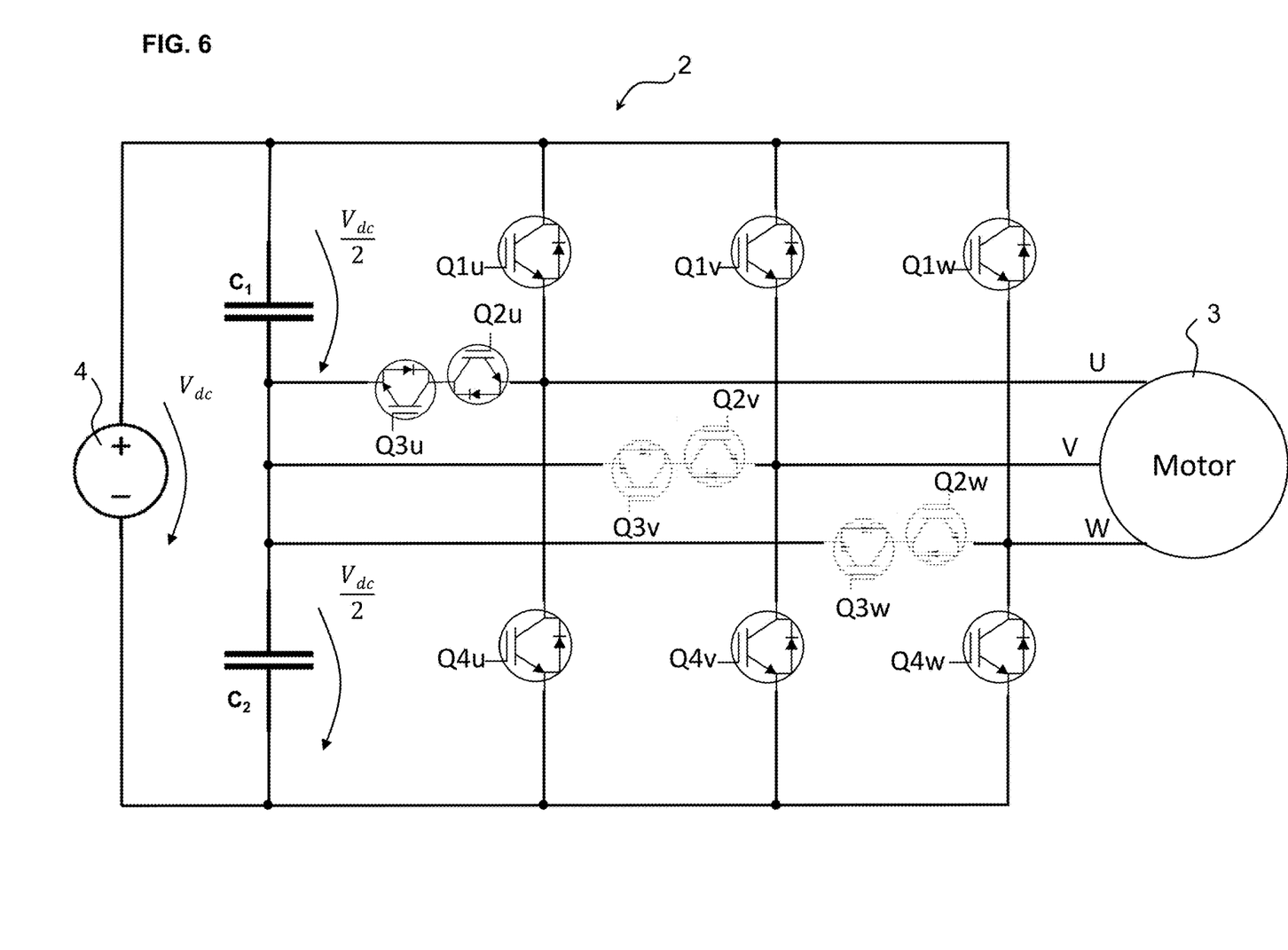
FIG. 6 is a schema of a circuit of a three phase motor connected to a three phase three-level inverter according to an embodiment of the invention.

For instance, as illustrated in FIGS. 5 and 6, many electrical motors are three phase U, V, W and thus the inverter according to an embodiment of the invention for such application is a three phase inverter. The principles described herein for one phase leg apply to each phase leg of the multiphase inverter.

gate drive unit includes or is connected to a control module 7 that receives voltage $V_{DC}$, $V_{NP}$ and phase current $i_u$, $i_w$, $i_v$ measurement inputs 8, 9 from the power supply 4 and motor 3 to control the gate drive and power electronics for control of the motor 3.

The power electronics module 5 comprise a multi-level multi-phase inverter 2 according to embodiments of the invention, as illustrated in FIGS. 5 and 6.

Although the illustrated embodiments show a three-level inverter for each phase leg, the invention also applies to higher level inverters, such as five level or seven level inverters per phase leg that enable the generation of smoother stepped output waveforms with lower harmonic distortions, but that also face the problem of neutral point control under certain operating conditions similarly to three-level inverters.

The present invention overcomes the problem of neutral point deviation by operating the multi-level inverter with a standard modulation scheme having three or more levels of modulation patterns, depending on the number of modulation levels of the inverter, when neutral point stability is high, and operating the multi-level inverter with a two-level modulation pattern when neutral point stability is low. The operation of the multi-level inverter may switch between three (or higher) level modulation and two-level modulation patterns depending on one or more operating parameters of the inverter and the load connected to the inverter.

The load may in particular comprise a multiphase, for instance three phase U, V, W, electrical motor 3 connected to a multiphase, for instance three phase inverter 2 according to embodiments of the invention as schematically illustrated in FIGS. 5 and 6.

Using the two level modulation pattern when starting a motor without sensor feedback also improves stability and control of the sensorless start.

Using the two level modulation pattern in a multi-level inverter according to embodiments of the invention also advantageously allows to reduce the size of the DC link capacitors $C_1$, $C_2$ compared to conventional multi-level inverters.

The inverter according to embodiments of the invention is connected to a gate drive unit 6 comprising or connected to a controller 7 that, inter alia, is connected to the inverter transistors Q1-Q4 to control the switching of the transistors for the generation of the modulation patterns, in particular the pulse width modulation (PWM) patterns of the standard multi-level modulation scheme and the two-level modulation scheme.

The switching states of the transistors Q1, Q2, Q3 and Q4 of three-level inverters of both embodiments of FIGS. 1a and 1b for three-level modulation is illustrated in the table below:

| Switching state | Voltage between the neutral point NP and the output $V_{out\text{-}NP}$ | Q1 | Q2 | Q3 | Q4 |
|---|---|---|---|---|---|
| Positive (P) | $+V_{DC}/2$ | On | On | Off | Off |
| Neutral (0) | 0 | Off | On | On | Off |
| Negative (N) | $-V_{DC}/2$ | Off | Off | On | On |

Figure 4A:
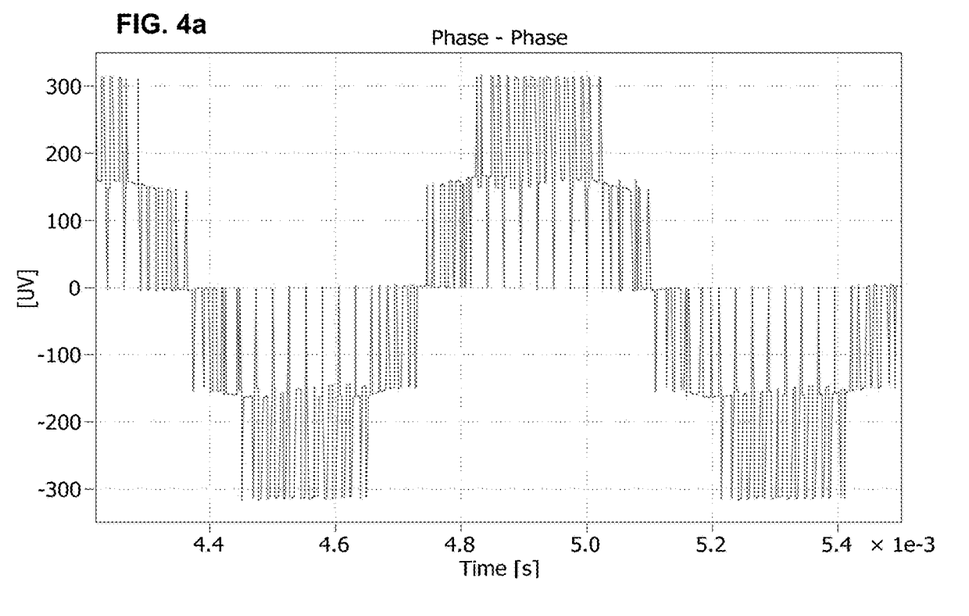
FIG. 4a is a schema illustrating a three-level PWM signal and corresponding output signal when the multi-level inverter according to an embodiment of the invention is operating in three-level mode.

Referring to FIGS. 5 and 6, according to an aspect of the invention, an electrical motor system comprises a multi-phase U, V, W electrical motor 3 connected to a drive 1 and a DC power supply 4. The drive 1 comprises a power electronics module 5 connected to a gate drive unit 6. The The corresponding three-level PWM signal is illustrated in FIG. 4a whereby the PWM signal has an inverter phase leg output voltage $V_{Out\text{-}G}$ with values $+V_{DC}$, $+V_{DC}/2$ and 0 for the positive portion of voltage signal, and values 0, $-V_{DC}/2$, and $-V_{DC}$ for the negative portion of voltage signal.

The switching states of the transistors Q1, Q2, Q3 and Q4 of the three-level inverters of both embodiments of FIGS. 1a and 1b for operation in two-level modulation mode is illustrated in the table below:

| Switching state | Voltage between the neutral point NP and the output $V_{Out-NP}$ | Q1 | Q2 | Q3 | Q4 |
| --- | --- | --- | --- | --- | --- |
| Positive (P) | $+V_{DC}/2$ | On | On | Off | Off |
| Negative (N) | $-V_{DC}/2$ | Off | Off | On | On |

Figure 4B:
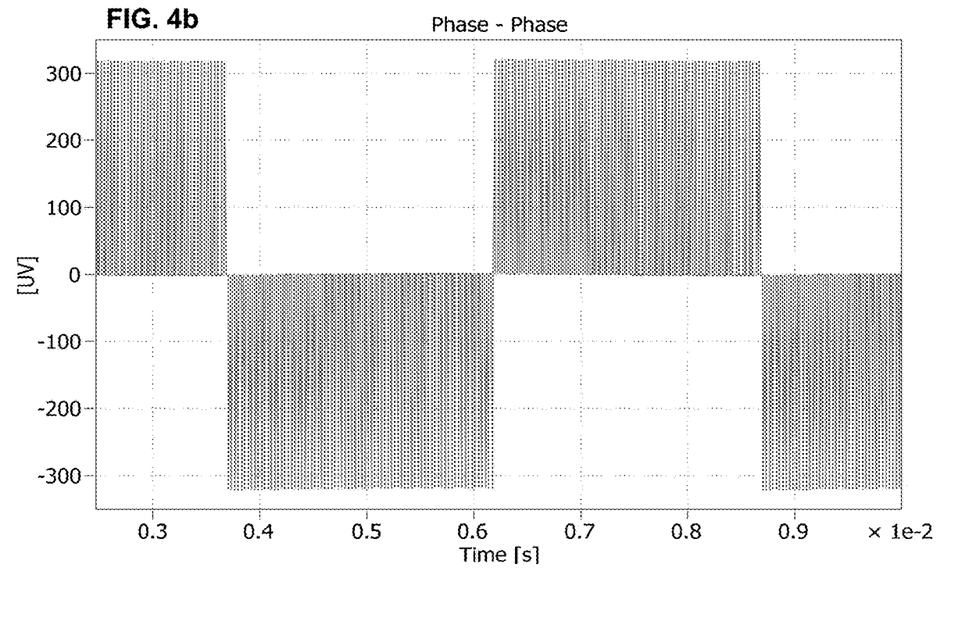
FIG. 4b is a schema illustrating a two-level PWM signal and corresponding output signal when the multi-level inverter according to an embodiment of the invention is operating in two-level mode.

The corresponding two-level PWM signal is illustrated in FIG. 4b whereby the PWM signal has an inverter phase leg output voltage $V_{Out-G}$ with values $+V_{DC}$, and 0 for the positive portion of voltage signal, and values 0, and $-V_{DC}$ for the negative portion of voltage signal.

In both inverter circuit designs of FIGS. 1a and 1b, a two-level inverter mode of operation can easily be achieved by avoiding the switching state "Neutral (0)". It may be noted that in two-level mode the gate drive unit is configured to drive the transistor pair Q1-Q3 and transistor pair Q2-Q4 always in complementary manner such that they are in an opposite switching states.

The gate drive unit controller receives measurement signals of the operating parameters from the load and the inverter that are used to determine the operating mode, in particular the level of the PWM modulation pattern level, and to control the switching between standard multi-level modulation, two-level modulation, or no modulation.

Figure 2:
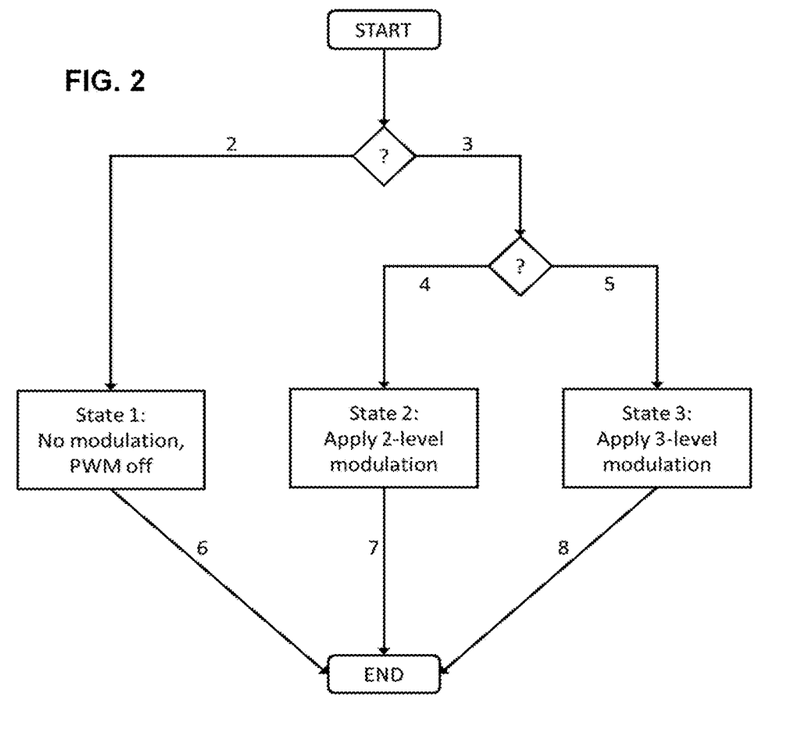
FIG. 2 is a flow diagram illustrating schematically an overall method of controlling a multi-level inverter according to an embodiment of the invention.

An illustration of these modulation modes or states is schematically illustrated in FIG. 2, whereby the transition between states (no modulation, 3 level modulation, 2 level modulation) in this example is briefly explained in the table below.

| Transition | Description |
| --- | --- |
| 1 | Initial and automatic transition |
| 2 | Modulation of inverter is requested to switch off. No pulses are generated any more. |
| 3 | Modulation of inverter is requested to be switched on. |
| 4 | The 2-level modulation strategy is selected depending on operating parameters selected from any one or more of:<br>1) High neutral point potential deviation<br>2) Low stator frequency of the motor connected to the inverter<br>3) Low power factor cos($\phi$) of the motor connected to the inverter<br>4) Low phase current magnitude<br>5) Low PWM frequency |
| 5 | The 3-level modulation strategy is selected for all other cases than listed under transition 4. |
| 6, 7, 8 | Automatic transitions |

Operating parameters that may be measured or computed and used by the gate drive unit 6 to determine whether to operate the inverter in two-level or multi-level modulation mode, where the electrical load is an electrical motor 3, are presented below:

| Parameter | Description | Typical operating range of values |
| --- | --- | --- |
| $V_{np}$ | Neutral point voltage | A predetermined value depending on the characteristics of the system (motor and supply) [V] |
| $\varepsilon_{np}$ | Deviation of neutral point voltage ( $\mid V_{DC}/2 - V_{NP} \mid$ ) in %; | Threshold value having a value between 0 to 50 [%]; |
| $\omega$ | Stator frequency | 0 to 40% of nominal speed |
| $\cos(\varphi)$ | Motor power factor = Real power/Apparent power | 0 to 1 [—] |
| $I_{ph}$ | Motor phase current | A predetermined value depending on the characteristics of the motor [A] |
| $f_{pwm}$ | Modulation (PWM) frequency | 0 to 100 [kHz] |

According to embodiments of the invention, the threshold values of the above mentioned parameters are set in the following ranges:

| Parameter | Description | Threshold values for determining transition to two-level modulation |
|---|---|---|
| $\omega_{min}$ | Minimum motor stator frequency | 0 to 40% of nominal speed |
| $\varepsilon_{np\_max}$ | Allowed deviation of neutral point voltage in % | 0 to 50 [%] |
| $PF_{min}$ | Motor minimum power factor | 0 to 0.7 [—] |
| $I_{ph\_min}$ | Motor minimum phase current | A predetermined value depending on the characteristics of the motor [A] |
| $f_{pwm\_min}$ | Minimum PWM frequency | 0 to 50 [kHz] |

In advantageous embodiments, the threshold values may in particular be set in the following ranges:

| Parameter | Description | Threshold values for determining transition to two-level modulation |
|---|---|---|
| $\omega_{min}$ | Minimum motor stator frequency | 5 to 30% of nominal speed |
| $\varepsilon_{np\_max}$ | Allowed deviation of neutral point voltage in % | 5 to 30 [%] |
| $PF_{min}$ | Motor minimum power factor | 0.1 to 0.5 [—] |
| $I_{ph\_min}$ | Motor minimum phase current | 5% to 40% of Nominal current [A] |
| $f_{pwm\_min}$ | Minimum PWM frequency | 1 to 30 [kHz] |

Preferably, according to advantageous embodiments of the invention, the threshold values may be set in the following ranges:

| Parameter | Description | Threshold values for determining transition to two-level modulation |
|---|---|---|
| $\omega_{min}$ | Minimum motor stator frequency | 5% to 15% of nominal speed |
| $\varepsilon_{np\_max}$ | Allowed deviation of neutral point voltage in % | 10 to 20 [%] |
| $PF_{min}$ | Motor minimum power factor | 0.1 to 0.3 [—] |
| $I_{ph\_min}$ | Motor minimum phase current | 10% to 30% of Nominal current [A] |
| $f_{pwm\_min}$ | Minimum PWM frequency | 5 to 15 [kHz] |

An example of threshold values of the above mentioned parameters in an advantageous embodiment is illustrated below:

| Parameter | Description | Threshold values for determining transition to two-level modulation |
|---|---|---|
| $\omega_{min}$ | Minimum motor stator frequency | 10% of nominal speed |
| $\varepsilon_{np\_max}$ | Allowed deviation of neutral point voltage in % | 15 [%] |
| $PF_{min}$ | Motor minimum power factor | 0.2 [—] |
| $I_{ph\_min}$ | Motor minimum phase current | 20% of Nominal current [A] |
| $f_{pwm\_min}$ | Minimum PWM frequency | 8 [kHz] |

A range of values, or a threshold value (e.g. a minimum or maximum value), or a plurality of threshold values (lower bound and upper bound), may be set for any one or more of the above parameters and stored for instance in a lookup table in a memory, preferably in a memory of the gate drive unit. The gate drive unit receives measurement values of said any one or more of the above parameters and compares them with the stored values to determine the control mode of the inverter. For instance, if frequency ω of motor stator coils drops below a threshold value of 40% of the nominal speed (frequency) of the motor in the above example, the gate drive unit transitions operation of the inverter from standard multi-level (three-level in the illustrated embodiments) operation to two-level modulation, and when frequency ω of the motor stator coils increases above a threshold value of 40% of the nominal speed (frequency) the gate drive unit transitions operation of the inverter from two-level modulation back to standard multi-level (three-level in the illustrated embodiments) operation. Thus, when the operating parameter is in a first range on one side of a threshold value, in which the neutral point is stable (either below or above the threshold value depending on the parameter), the inverter operates in standard multi-level modulation mode, and if the operating parameter value crosses the threshold value to the other side constituting a second range in which the neutral point is potentially unstable, the inverter mode of operation switches to the two level modulation mode.

Figure 3:
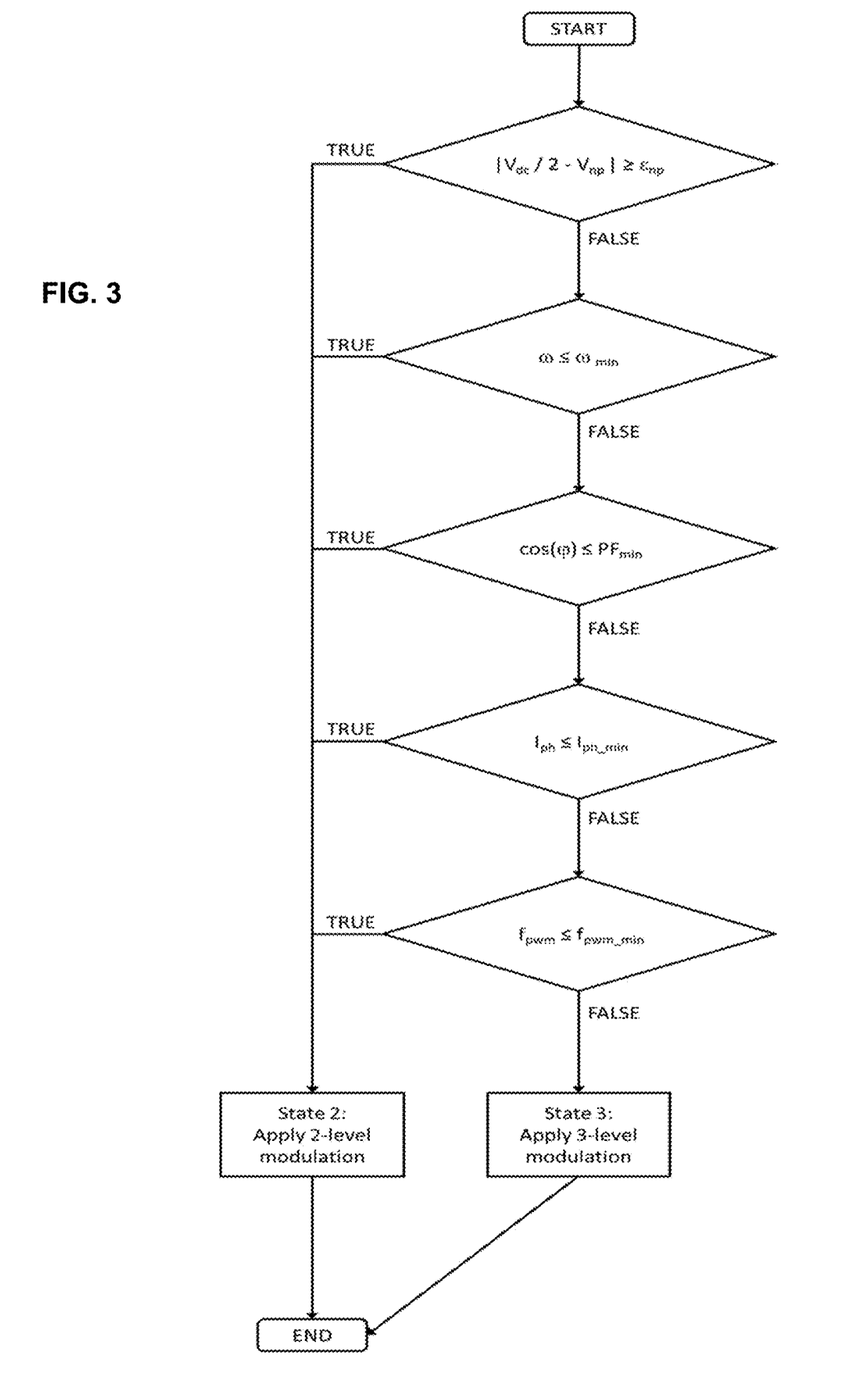
FIG. 3 is a flow diagram illustrating schematically a method of controlling a multi-level inverter according to an embodiment of the invention.

It may be noted that, in embodiments, the transition threshold values of the parameters used to control operation of the inverter between two-level and multi-level modulation patterns, may be different depending on the direction of the transition to ensure a partial overlap of ranges of values determining the transition. In particular, the transition from two-level to multi-level modulation may have a different threshold value than the threshold value for the transition from multi-level modulation to two-level modulation such that the range of operation in two-level mode overlaps partially the range of operation in three or high level operation mode in order to avoid instability around the transition value. For instance, the threshold value of the stator frequency ω may be 40% of the nominal motor frequency in the direction of decreasing frequency for transition from three to two-level modulation, whereas the threshold value of the stator frequency ω may be 45% of the nominal motor frequency in the direction of increasing frequency for transition from two to three-level modulation. The aforegoing feature may apply to any one or more of the values having a threshold to control the transition from one modulation pattern to the other modulation pattern Any parameter or combination of parameters that are indicative of a deviation or an instability of the neutral point voltage beyond desired amplitudes for accurate control of the system (e.g. electrical motor) may be used to set transition values for changing the modulation pattern of the inverter. In embodiments of an electrical motor connected to an inverter, the preferred parameters for determining the modulation pattern may include: neutral point potential deviation $V_{np}$, stator frequency ω of the motor, power factor cos(Φ) of the motor, phase current magnitude $I_{ph}$ and PWM frequency $f_{pwm}$. All of these preferred parameters may be used to control the operation mode of the inverter between three-level (multi-level) or two-level as illustrated in the flow diagram of FIG. 3. It may however be noted that only one, or only a subset of the preferred parameters may be used to control the operation mode of the inverter between three-level (multi-level) or two-level. Moreover, as mentioned above, other parameters that are indicative of a deviation or an instability of the neutral point voltage beyond desired amplitudes may be employed to control the operation mode of the inverter between multi-level and two-level operation.

Furthermore, in variants, two or more of the control parameters may also be combined, for instance a ratio or a multiplication of parameters to form a composite value, for instance a ratio of phase current magnitude with respect to PWM frequency $Iph/f_{pwm}$ or a product of the phase current magnitude and the PWM frequency $I_{ph} \times f_{pwm}$ Another example would be a weighted sum between phase current magnitude, PWM frequency and stator frequency, the factors $k_x$ are scaling factors $k_1*I_{ph}+k_2*f_{pwm}+k_3*\omega$.

The invention claimed is:

1. Method of controlling a multi-level inverter having inputs connected to a drive unit controlling the inverter and an output connected to a load, the multi-level inverter capable of generating a PWM voltage signal having three or more modulation levels, the inverter powered by a voltage supply and comprising at least one neutral point, the method comprising operating the multi-level inverter in a standard modulation pattern having three or more modulation levels when one or more parameters representative of neutral point stability each have a value within a first range indicative of a high neutral point stability, and operating the multi-level inverter with a two-level modulation pattern when said one or more parameters representative of neutral point stability each have a value within a second range indicative of a low neutral point stability, the first range separated from the second range by a threshold value, wherein said threshold values of parameters representative of low neutral point stability include any one or more of:

| | | |
|---|---|---|
| $\omega_{min}$ | Minimum motor stator frequency | Threshold value having a value between 0 to 40% of nominal speed; |
| $\varepsilon_{np\_max}$ | Allowed deviation of neutral point voltage in % | Threshold value having a value between 0 to 50 [%]; |
| $PF_{min}$ | Motor minimum power factor | Threshold value having a value between 0 to 0.7 [-]; |
| $I_{ph\_min}$ | Motor minimum phase current | Threshold value having a predetermined value depending on the characteristics of the motor [A]; |
| $f_{pwm\_min}$ | Minimum PWM frequency | Threshold value having a value between 0 to 50 [kHz]. |

2. Method according to claim 1, wherein the load is a multiphase electric motor, and the inverter comprises a multi-level modulation circuit for each phase leg, each multi-level modulation circuit having an output connected to a corresponding phase of the electric motor.

3. Method according to claim 1, wherein the parameters representative of neutral point stability include any one or more of:

| | |
|---|---|
| $V_{np}$ | Neutral point voltage; |
| ω | Motor stator frequency; |
| $\varepsilon_{np}$ | Deviation of neutral point voltage ( $\|V_{DC}/2 - V_{NP}\|$ ) in %; |
| cos(φ) | Motor power factor = Real power/Apparent power; |
| $I_{ph}$ | Motor phase current; |
| $f_{pwm}$ | Modulation (PWM) frequency. |

4. Method according to claim 1, wherein the threshold value for each of the one or more parameters are selected as:

| | | |
|---|---|---|
| $\omega_{min}$ | Minimum motor stator frequency | Threshold value having a value between 5% to 30% of nominal speed, |
| $\varepsilon_{np}$ | Allowed deviation of neutral point voltage in % | Threshold value having a value between 5 to 30 [%], |
| $PF_{mi}$ | Motor minimum power factor | Threshold value having a value between 0.1 to 0.5 [-], |
| $I_{ph\_min}$ | Motor minimum phase current | 5% to 40% of Nominal current [A], |
| $f_{pwm\_min}$ | Minimum PWM frequency | Threshold value having a value between 1 to 30 [kHz]. |

5. Method according to claim 4, wherein the threshold value for each of the one or more parameters are selected as:

| | | |
|---|---|---|
| $\omega_{min}$ | Minimum motor stator frequency | Threshold value having a value between 5% to 15% of nominal speed, |
| $\varepsilon_{np}$ | Allowed deviation of neutral point voltage in % | Threshold value having a value between 10 to 20 [%], |
| $PF_{mi}$ | Motor minimum power factor | Threshold value having a value between 0.1 to 0.3 [-], |
| $I_{ph\_min}$ | Motor minimum phase current | 10% to 30% of Nominal current [A], |
| $f_{pwm\_min}$ | Minimum PWM frequency | Threshold value having a value between 5 to 15 [kHz]. |

6. A drive for an electrical motor comprising a power electronics module and a gate drive unit connected to a controller and to the power electronics module to control the motor, the power electronics module comprising a multi-level inverter having at least one output connected to at least one phase of the motor, the multi-level inverter capable of generating a PWM voltage signal having three or more modulation levels, the inverter powered by a voltage supply and comprising at least one neutral point, wherein the controller is configured to control the gate drive unit to:
- operate the multi-level inverter in a standard modulation pattern having three or more modulation levels when one or more parameters representative of neutral point stability each have a value within a first range indicative of a high neutral point stability, and to
- operate the multi-level inverter with a two-level modulation pattern when said one or more parameters representative of neutral point stability each have a value within a second range indicative of a low neutral point stability,
- the first range separated from the second range by a threshold value, wherein the threshold values are stored in, or computed from values stored in a non-transient memory of the drive and wherein an executable control algorithm is stored in a non-transient memory of the drive, the control algorithm executable by the controller to control the gate drive unit.

7. The drive of claim 6, wherein the controller receives voltage ($V_{DC}$, $V_{NP}$) and phase current ($i_u$, $i_w$, $i_v$) measurement inputs from a power supply and the motor, the power supply comprising a DC voltage supply.

8. The drive of claim 6, wherein the motor is a multi-phase (U, V, W) motor and the inverter is a multi-phase inverter having one said output for each phase.

9. The drive of claim 6, wherein the inverter is a diode clamped inverter.

10. The drive of claim 6, wherein the inverter comprises a neutral point clamped (NPC) inverter circuit topology per phase leg.

11. The drive of claim 6, wherein the inverter comprises a T-type three-level inverter circuit topology per phase leg.

12. The drive of claim 6, wherein the threshold values are stored in, or computed from values stored in a non-transient memory of the drive and wherein an executable control algorithm is stored in a non-transient memory of the drive, the control algorithm executable by the controller to control the gate drive unit.

13. The drive of claim 6, wherein the threshold values representative of low neutral point stability include any one or more of:

| | | |
|---|---|---|
| $\omega_{min}$ | Minimum motor stator frequency | Threshold value having a value between 0 to 40% of nominal speed; |
| $\varepsilon_{np\_max}$ | Allowed deviation of neutral point voltage in % | Threshold value having a value between 0 to 50 [%]; |
| $PF_{min}$ | Motor minimum power factor | Threshold value having a value between 0 to 0.7 [–]; |
| $I_{ph\_min}$ | Motor minimum phase current | Threshold value having a predetermined value depending on the characteristics of the motor [A]; |
| $f_{pwm\_min}$ | Minimum PWM frequency | Threshold value having a value between 0 to 50 [kHz]. |

14. The drive of claim 6, wherein the parameters representative of neutral point stability include any one or more of:

| | |
|---|---|
| $V_{np}$ | Neutral point voltage; |
| $\omega$ | Motor stator frequency; |
| $\varepsilon_{np}$ | Deviation of neutral point voltage ( $\|V_{DC}/2 - V_{NP}\|$ ) in %; |
| $\cos(\varphi)$ | Motor power factor = Real power/Apparent power; |
| $I_{ph}$ | Motor phase current; |
| $f_{pwm}$ | Modulation (PWM) frequency. |

* * * * *